United States Patent
Gushi et al.

(10) Patent No.: US 12,488,813 B2
(45) Date of Patent: Dec. 2, 2025

(54) MAGNETIC DOMAIN WALL MOTION ELEMENT AND MAGNETIC ARRAY

(71) Applicant: TDK CORPORATION, Tokyo (JP)

(72) Inventors: Toshiki Gushi, Tokyo (JP); Shogo Yamada, Tokyo (JP); Tomoyuki Sasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 136 days.

(21) Appl. No.: 18/426,708

(22) Filed: Jan. 30, 2024

(65) Prior Publication Data
US 2025/0246212 A1    Jul. 31, 2025

(51) Int. Cl.
| | |
|---|---|
| G11C 5/00 | (2006.01) |
| G11C 5/08 | (2006.01) |
| G11C 11/16 | (2006.01) |
| H10B 61/00 | (2023.01) |
| H10N 50/10 | (2023.01) |
| H10N 50/80 | (2023.01) |

(52) U.S. Cl.
CPC ............... *G11C 5/08* (2013.01); *G11C 11/161* (2013.01); *G11C 11/1675* (2013.01); *H10B 61/22* (2023.02); *H10N 50/10* (2023.02); *H10N 50/80* (2023.02)

(58) Field of Classification Search
CPC ......... G11C 11/16; G11C 19/08; G11C 11/00; G11C 11/18; G11C 11/14; G11C 11/15; G11C 19/00; G11C 5/06; G11C 11/02; G11C 11/22; G11C 13/00; G11C 19/02; G11C 5/08
See application file for complete search history.

(56) References Cited

U.S. PATENT DOCUMENTS

| | | | |
|---|---|---|---|
| 8,902,642 B2 * | 12/2014 | Mitou | .................. G11C 11/1673 365/158 |
| 2008/0137395 A1 | 6/2008 | Hwang et al. | |
| 2009/0296454 A1 | 12/2009 | Honda et al. | |
| 2020/0105310 A1 | 4/2020 | Ashida et al. | |

FOREIGN PATENT DOCUMENTS

| | | |
|---|---|---|
| JP | 2020-053660 A | 4/2020 |
| WO | 2008/047536 A1 | 4/2008 |

OTHER PUBLICATIONS

Zhang et al., "Highly Efficient Domain Walls Injection in Perpendicular Magnetic Anisotropy Nanowire," Scientific Reports, Apr. 21, 2016, vol. 6, No. 24804, pp. 1-8.

* cited by examiner

*Primary Examiner* — Thong Q Le
(74) *Attorney, Agent, or Firm* — Oliff PLC

(57) ABSTRACT

A magnetic domain wall motion element includes a first ferromagnetic layer, in-plane wiring, and first, second and third via wirings. A position of the in-plane wiring in a stacking direction is different from that of the first ferromagnetic layer. The first via wiring connects the first ferromagnetic layer and in-plane wiring. The second via wiring is connected to the in-plane wiring at a different position from the first. The third via wiring is connected to the in-plane wiring at a different position from the first and second. When positions of the second and the third via wirings are projected on an axis passing through a center of the first via wiring when viewed in the stacking direction and extending in a second direction, the first via wiring is interposed between projection points of the second and third via wirings to the axis in the second direction.

11 Claims, 12 Drawing Sheets

MAGNETIC DOMAIN WALL MOTION ELEMENT AND MAGNETIC ARRAY

BACKGROUND OF THE INVENTION

Field of the Invention

The present disclosure relates to a magnetic domain wall motion element and a magnetic array.

Description of Related Art

A magnetoresistive element that utilizes a change in resistance value (a change in magnetoresistance) based on a change in relative angle of a magnetization between two ferromagnetic layers is known. For example, a magnetic domain wall motion type magnetoresistive element described in Patent Document 1 is an example of a magnetoresistive element. In a magnetic domain wall motion element, a resistance value in a stacking direction changes depending on a position of a domain wall, and data can be recorded in a multi-level or analog manner. The magnetic domain wall motion element has high linearity and symmetry in resistance change and excellent rewriting resistance, and is capable of high-speed operation.

For example, Patent Document 1 discloses a magnetic recording array using a magnetic domain wall motion element.

PATENT DOCUMENTS

[Patent Document 1] Japanese Unexamined Patent Application, First Publication No. 2020-53660

SUMMARY OF THE INVENTION

In a magnetic domain wall motion element, a signal is written by applying a write current thereto. A magnetic field generated when a write current flows through a wiring may affect a magnetization of the magnetic domain wall motion element. That is, the magnetic field generated when a write current flows through the wiring may reduce the reliability of data held by the magnetic domain wall motion element.

The present disclosure has been made in view of the above problems, and an object of the present disclosure is to provide a magnetic domain wall motion element and a magnetic array having high reliability.

A magnetic domain wall motion element according to a first aspect includes a first ferromagnetic layer, an in-plane wiring, a first via wiring, a second via wiring, and a third via wiring. A position of the in-plane wiring in a stacking direction is different from that of the first ferromagnetic layer. The first via wiring connects the first ferromagnetic layer and the in-plane wiring to each other. The second via wiring is connected to the in-plane wiring at a different position from the first via wiring. The third via wiring is connected to the in-plane wiring at a different position from the first via wiring and the second via wiring. When positions of the second via wiring and the third via wiring are projected on an axis passing through a center of the first via wiring when viewed in the stacking direction and extending in a second direction orthogonal to a first direction that is a longitudinal direction of the first ferromagnetic layer and the stacking direction, the first via wiring is interposed between projection points of the second via wiring and the third via wiring to the axis in the second direction.

DETAILED DESCRIPTION OF THE INVENTION

Figure 1:
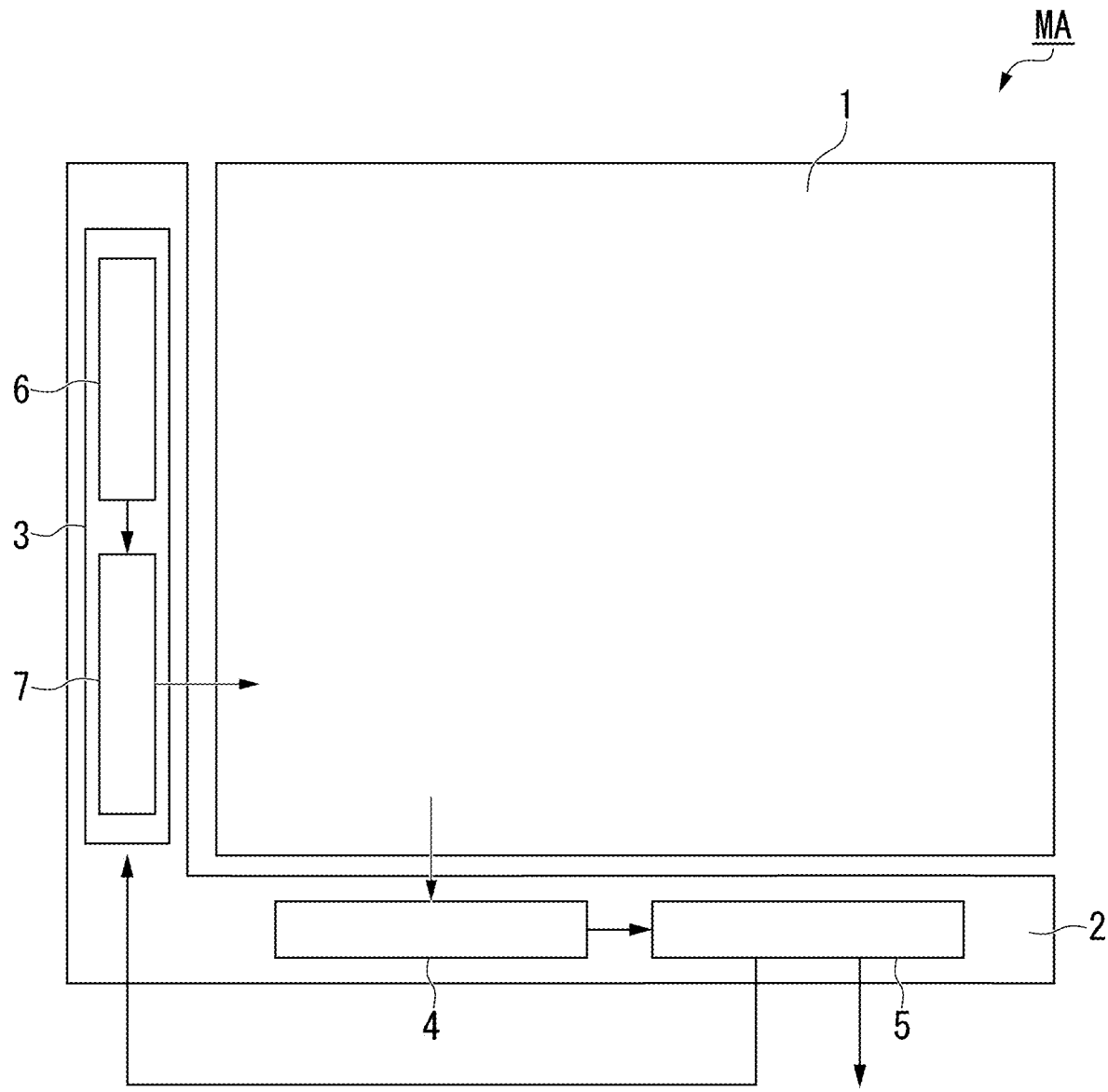
FIG. 1 is a block diagram of a magnetic array according to a first embodiment.

Hereinafter, the present embodiment will be described in detail with appropriate reference to the drawings. In the drawings used in the following description, feature portions may be enlarged for convenience to make the features of the present disclosure easy to understand, and dimensional ratios of each constituent element and the like may be different from the actual ones. Materials, dimensions, and the like exemplified in the following description are examples, and the present disclosure is not limited thereto and can be appropriately modified and carried out within the scope in which the effects of the present disclosure are exhibited.

First, directions will be defined. An x direction and a y direction are directions substantially parallel to one surface of a substrate on which a magnetic domain wall motion element is stacked. The x direction is a direction in which a first ferromagnetic layer that will be described below extends. The x direction is an example of a first direction. The y direction is a direction orthogonal to the x direction. The y direction is an example of a second direction. The z direction is a stacking direction of layers of the magnetic domain wall motion element. In the present specification, a +z direction may be expressed as "up" and a −z direction may be expressed as "down," but these expressions are for convenience and do not define the direction of gravity. Further, in this description, the term "extending in the x direction" means that, for example, the dimension in the x direction is larger than the smallest dimension among the dimensions in the x direction, the y direction, and the z direction. The same applies to cases of extending in other directions.

First Embodiment

FIG. 1 is a block diagram of a magnetic array MA according to a first embodiment. The magnetic array MA has an integrated region 1 and a peripheral region 2. The magnetic array MA can be used in, for example, a magnetic memory, a product and sum calculation device, a neuromorphic device, a spin memristor, or a magneto-optical element.

The integrated region 1 is a region in which a plurality of magnetic domain wall motion elements are integrated. In a case where the magnetic array MA is used as a memory, data is accumulated in the integrated region 1. In a case where the magnetic array MA is used as a neuromorphic device, a product and sum calculation of a neural network is performed in the integrated region 1.

The peripheral region 2 is a region in which a control element that controls the operation of the magnetic domain wall motion element within the integrated region 1 is mounted. The peripheral region 2 includes, for example, a control device 3, a resistance detection device 4, and an output part 5.

The control device 3 is configured to be able to apply a pulse to at least one of the plurality of magnetic domain wall motion elements within the integrated region 1. The control device 3 includes, for example, a control part 6 and a power supply 7.

The control part 6 includes, for example, a processor and a memory. The processor is, for example, a central processing unit (CPU). The processor operates on the basis of an operation program stored in the memory. The control part 6 controls, for example, the address of a magnetic domain wall motion element to which a pulse is applied, the magnitude (the voltage, the pulse length) of a pulse applied to a predetermined magnetic domain wall motion element, and the like. In addition to this, the control part 6 may also include a clock, a counter, a random number generator, and the like. The clock serves as an indicator of the timing of applying a pulse, and the counter counts the number of times the pulse is applied. The power supply 7 applies a pulse to the magnetic domain wall motion element according to instructions from the control part 6.

The resistance detection device 4 is configured to be able to detect the resistance value of the magnetic domain wall motion element within the integrated region 1. The resistance detection device 4 may detect the resistance of each magnetic domain wall motion element in the integrated region 1, or may detect the total resistance of magnetic domain wall motion elements belonging to the same column, for example. The resistance detection device 4 has, for example, a comparator that performs comparison in magnitude of the detected resistance value. The comparator may compare, for example, the detected resistance values with each other, or the detected resistance value with a reference resistance value set in advance.

The output part 5 is connected to the resistance detection device 4. The output part 5 includes, for example, a processor, an output capacitor, an amplifier, a converter, and the like. In a case where the magnetic array MA is used as a neuromorphic device, the output part 5 may perform a calculation of substituting the detection results of the resistance detection device 4 into an activation function. The calculation is performed by a processor, for example. The output part 5 outputs the calculation results to the outside. In a case where the magnetic array MA is used as a neuromorphic device, for example, an operation such as outputting the calculation result as an input signal for another magnetic array may be performed, or an operation such as outputting the calculation results to the outside as an identification rate may be performed. Further, the output part 5 may feed the calculation results back to the control device 3.

Figure 2:
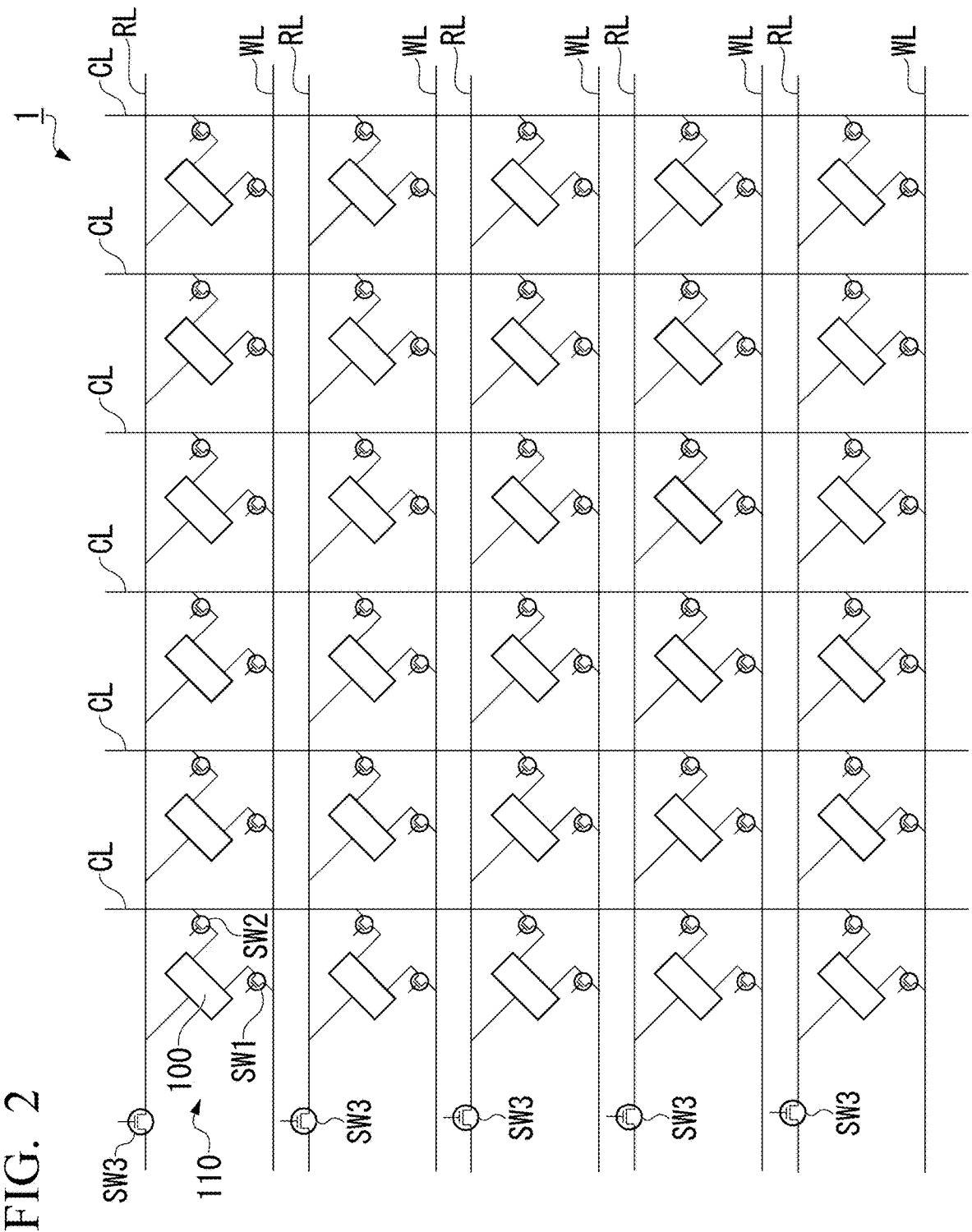
FIG. 2 is a circuit diagram of an integrated region of the magnetic array according to the first embodiment.

FIG. 2 is a circuit diagram of the integrated region 1 according to the first embodiment. The integrated region 1 includes a plurality of magnetic domain wall motion elements 110, a plurality of write wirings WL, a plurality of common wirings CL, and a plurality of read wirings RL. Each of the plurality of magnetic domain wall motion elements 110 includes a magnetoresistive element 100, a switch element SW1, and a switch element SW2. A switch element SW3 may belong to the control device 3 of the peripheral region 2, for example.

The plurality of magnetic domain wall motion elements 110 are arranged, for example, in a matrix. The plurality of magnetic domain wall motion elements 110 are not limited to those in which real elements are arranged in a matrix, and may be those in which real elements are arranged in a matrix in a circuit diagram.

Each of the write wirings WL is used when data is written. Each of the write wirings WL electrically connects the control device 3 and one or more magnetic domain wall motion elements 110 to each other. Each of the common wirings CL is used both when data is written and when data is read. Each of the common wirings CL is connected to, for example, the resistance detection device 4. Each of the common wirings CL may be provided in one of the plurality of magnetic domain wall motion elements 110 or may be provided over the plurality of magnetic domain wall motion elements 110. Each of the read wirings RL is used when data is read. Each of the read wirings RL electrically connects the control device 3 and one or more magnetic domain wall motion elements 110 to each other.

Each of the switch element SW1, the switch element SW2, and the switch element SW3 is an element that controls the flow of the current. Each of the switch element SW1, the switch element SW2, and the switch element SW3 is, for example, a transistor, an element using a phase change of a crystal layer such as an ovonic threshold switch (OTS), an element using a change in band structure such as a metal insulator transition (MIT) switch, an element using a breakdown voltage such as a Zener diode or an avalanche diode, or an element of which conductivity changes as an atomic position changes.

For example, the switch element SW1 and the switch element SW2 are connected to each magnetoresistive element 100 one by one. For example, the switch element SW1 is connected between the magnetoresistive element 100 and the write wiring WL. For example, the switch element SW2 is connected between the magnetoresistive element 100 and the common wiring CL. For example, the switch element SW3 is connected over the plurality of magnetoresistive elements 100. For example, the switch element SW3 is connected to the read wiring RL.

A positional relationship between the switch element SW1, the switch element SW2, and the switch element SW3 is not limited to the case shown in FIG. 2. For example, the switch element SW1 may be connected over the plurality of magnetoresistive elements 100 and may be located upstream of the write wiring WL. Further, for example, the switch element SW2 may be connected over the plurality of magnetoresistive elements 100 and may be located upstream of the common wiring CL. Further, for example, the switch element SW3 may be connected to each magnetoresistive element 100 one by one.

Figure 3:
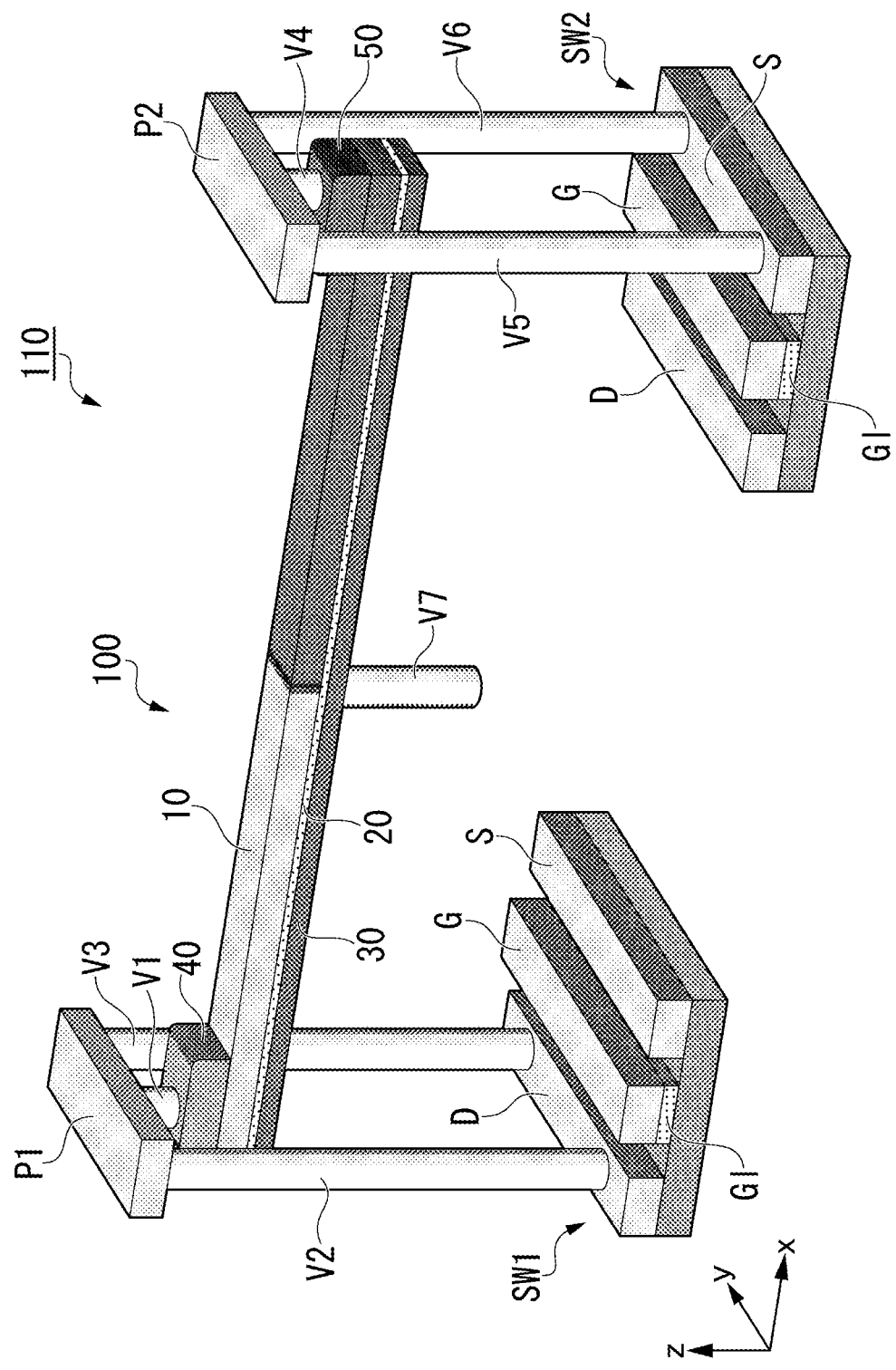
FIG. 3 is a perspective view of a magnetic domain wall motion element according to the first embodiment.

FIG. 3 is a perspective view of the magnetic domain wall motion element 110 of the integrated region 1 according to the first embodiment.

The magnetic domain wall motion element 110 is formed, for example, on a semiconductor substrate. A periphery of the magnetic domain wall motion element 110 is covered with an insulator (not shown). The insulator is made of, for example, silicon oxide ($SiO_x$), silicon nitride ($SiN_x$), silicon carbide (SiC), chromium nitride, silicon carbonitride (SiCN), silicon oxynitride (SiON), aluminum oxide ($Al_2O_3$), zirconium oxide ($ZrO_x$), or the like.

The magnetic domain wall motion element 110 shown in FIG. 3 includes a magnetoresistive element 100, an in-plane wiring P1, an in-plane wiring P2, a via wiring V1, a via wiring V2, a via wiring V3, a via wiring V4, a via wiring V5, a via wiring V6, a via wiring V7, a switch element SW1, and a switch element SW2.

Each of the switch element SW1 and the switch element SW2 shown in FIG. 3 is a transistor. The transistor has a gate electrode G, a gate insulating film GI, a source S, and a drain D. The source S and the drain D are predetermined according to a flow direction of the current and both are active regions of a semiconductor. FIG. 3 shows only one example, and a positional relationship between the source S and the drain D may be reversed. Both the switch element SW1 and the switch element SW2 are examples of a first switch element.

Each of the in-plane wiring P1 and the in-plane wiring P2 is a wiring that extends within an xy plane. Each of the in-plane wiring P1 and the in-plane wiring P2 is a wiring that extends in the y direction.

The in-plane wiring P1 and the in-plane wiring P2 are each located at a different height from a first ferromagnetic layer 10 of the magnetoresistive element 100. The specific configuration of the magnetoresistive element 100 will be described below. Each of the in-plane wiring P1 and the in-plane wiring P2 is a conductor.

The via wiring V1 connects the first ferromagnetic layer 10 of the magnetoresistive element 100 and the in-plane wiring P1 to each other. The via wiring V1 is a conductor. The via wiring V1 may directly connect the first ferromagnetic layer 10 and the in-plane wiring P1 to each other, or may indirectly connect the first ferromagnetic layer 10 and the in-plane wiring P1 to each other with a first magnetization fixed layer 40 interposed therebetween. The via wiring V1 is an example of a first via wiring.

The via wiring V2 is connected to the in-plane wiring P1 at a different position from the via wiring V1. The via wiring V2 connects the in-plane wiring P1 and the switch element SW1 to each other. The via wiring V2 is a conductor. The via wiring V2 is connected, for example, to the drain D of the switch element SW1. The source S of the switch element SW1 is connected to the write wiring WL. The via wiring V2 is an example of a second via wiring.

The via wiring V3 is connected to the in-plane wiring P1 at a different position from the via wiring V1 and the via wiring V2. The via wiring V3 connects the in-plane wiring P1 and the switch element SW1 to each other. The via wiring V3 is a conductor. The via wiring V3 shown in FIG. 3 is connected to the same switch element SW1 to which the via wiring V2 is connected. The via wiring V3 is connected, for example, to the drain D of the switch element SW1. The via wiring V3 is an example of a third via wiring.

The via wiring V4 connects the first ferromagnetic layer 10 of the magnetoresistive element 100 and the in-plane wiring P2 to each other. The via wiring V4 may directly connect the first ferromagnetic layer 10 and the in-plane wiring P2 to each other, or may indirectly connect the first ferromagnetic layer 10 and the in-plane wiring P2 to each other with a second magnetization fixed layer 50 interposed therebetween. The via wiring V4 is a conductor. The via wiring V4 is an example of the first via wiring.

The via wiring V5 is connected to the in-plane wiring P2 at a different position from the via wiring V4. The via wiring V5 connects the in-plane wiring P2 and the switch element SW2 to each other. The via wiring V5 is a conductor. The via wiring V5 is connected, for example, to the source S of the switch element SW2. The drain D of the switch element SW2 is connected to the common wiring CL. The via wiring V5 is an example of the second via wiring.

The via wiring V6 is connected to the in-plane wiring P2 at a different position from the via wiring V4 and the via wiring V5. The via wiring V6 connects the in-plane wiring P2 and the switch element SW2 to each other. The via wiring V6 is a conductor. The via wiring V6 shown in FIG. 3 is connected to the same switch element SW2 to which the via wiring V5 is connected. The via wiring V6 is connected, for example, to the source S of the switch element SW2. The via wiring V6 is an example of the third via wiring.

The via wiring V7 is connected to a second ferromagnetic layer 30 of the magnetoresistive element 100. The via wiring V7 may be directly connected to the second ferromagnetic layer 30, or may be indirectly connected through another layer. The via wiring V7 is a conductor. The via wiring V7 is connected to the read wiring RL.

Figure 4:
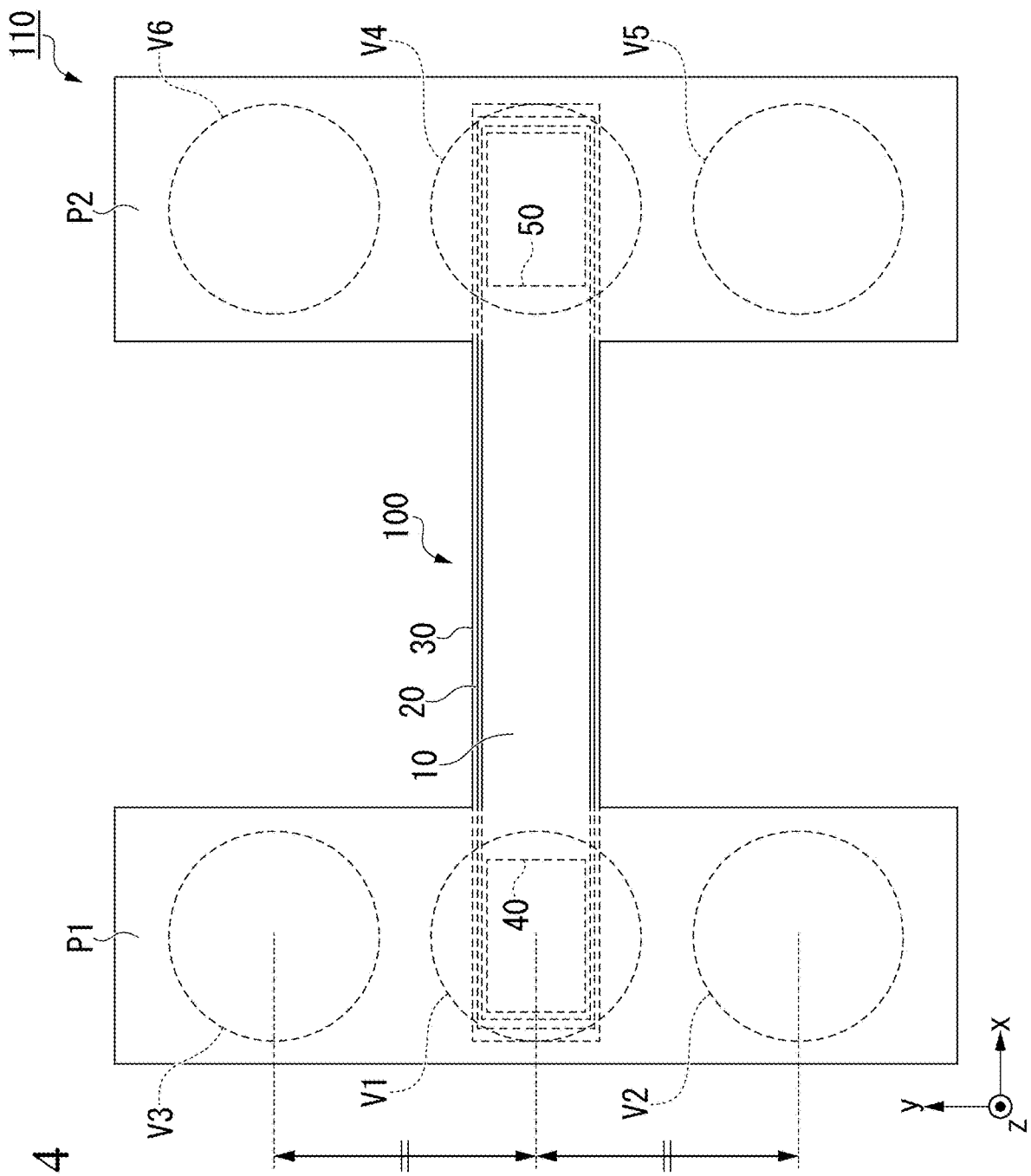
FIG. 4 is a plan view of the magnetic domain wall motion element according to the first embodiment.

FIG. 4 is a plan view of a characteristic portion of the magnetic domain wall motion element 110 of the integrated region 1 according to the first embodiment.

The via wiring V1 is interposed between the via wiring V2 and the via wiring V3 in the y direction.

Figure 5:
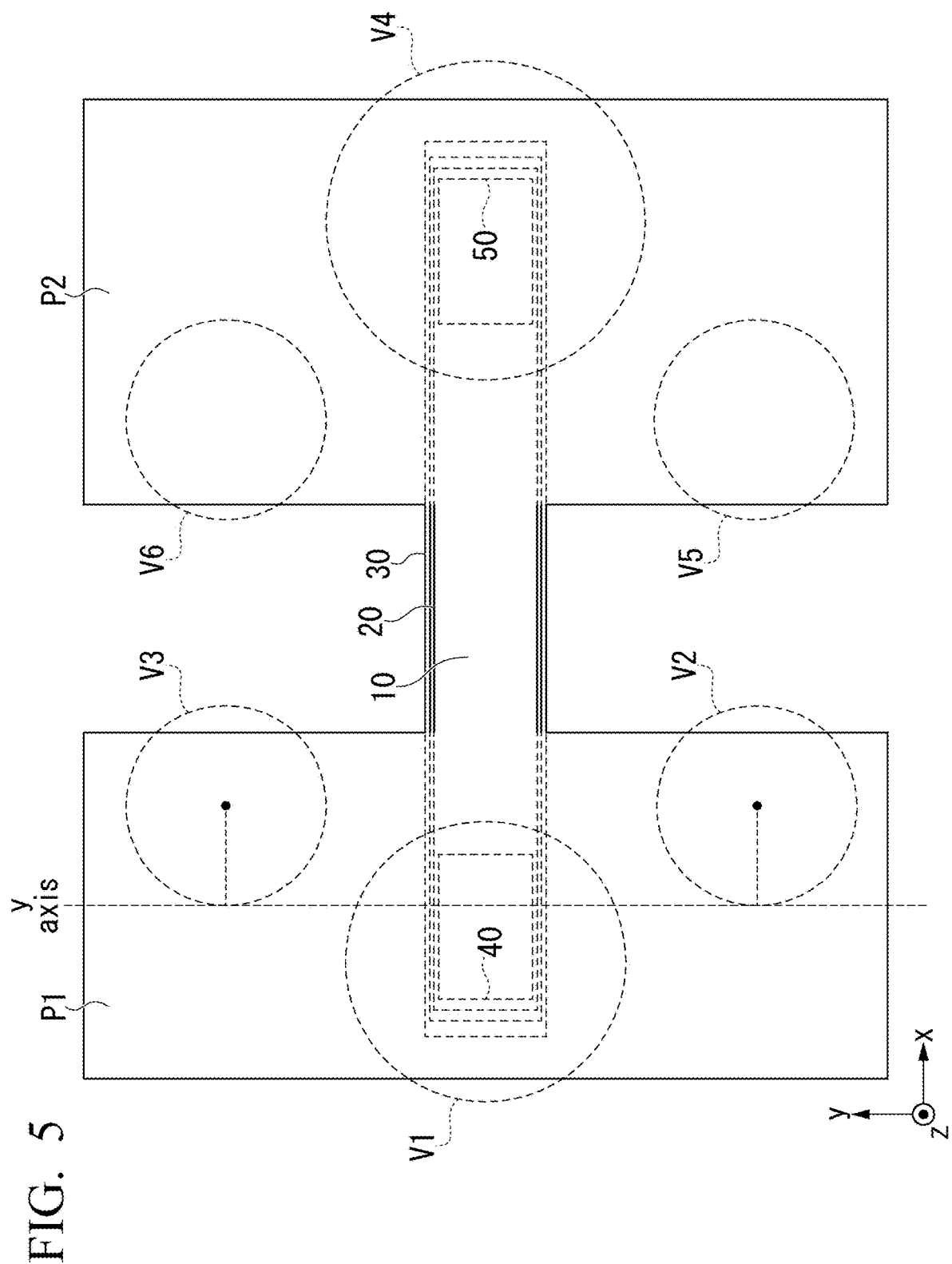
FIG. 5 is a plan view of a magnetic domain wall motion element according to a modification example.

FIG. 5 is a plan view of a characteristic portion of a magnetic domain wall motion element according to a modification example. As shown in FIG. 5, the positions of the via wiring V1, the via wiring V2, and the via wiring V3 in the x direction may be deviated from each other. In a case where the positions of the via wiring V1, the via wiring V2, and the via wiring V3 in the x direction are deviated from each other, the via wiring V1 only has to be interposed between two projection points obtained by projecting the positions of the via wiring V2 and the via wiring V3 on a y axis in the y direction. The y-axis is an axis passing through the center of the via wiring V1 and extending in the y direction.

As shown in FIGS. 4 and 5, it is preferable that the positions of the via wiring V1, the via wiring V2, and the via wiring V3 in the x direction overlap each other. That is, when viewed in the y direction, it is preferable that the via wiring V1, the via wiring V2, and the via wiring V3 be located to at least partially overlap each other.

As shown in FIG. 4, it is preferable that at least a part of the via wiring V2 and the via wiring V3 be located at the same distance from the center of the via wiring V1. The distance between the center of the via wiring V1 and the center of the via wiring V2 does not necessarily have to match the distance between the center of the via wiring V1 and the center of the via wiring V3.

The diameters of the via wiring V1, the via wiring V2, and the via wiring V3 may all be the same as shown in FIG. 4, or may be different as shown in FIG. 5. Since more current flows through the via wiring V1 than through the via wiring V2 and the via wiring V3, it is preferable that the diameter of the via wiring V1 be larger than the diameter of each of the via wiring V2 and the via wiring V3.

Further, each of the via wiring V1, the via wiring V2, and the via wiring V3 may be included in the in-plane wiring P1 as shown in FIG. 4, or may partially protrude from the in-plane wiring P1 as shown in FIG. 5, when viewed in the z direction.

The via wiring V4 is interposed between the via wiring V5 and the via wiring V6 in the y direction. The positional relationship between the via wiring V4, the via wiring V5, and the via wiring V6 is the same as the positional relationship between the via wiring V1, the via wiring V2, and the via wiring V3. The via wiring V4 corresponds to the via wiring V1, the via wiring V5 corresponds to the via wiring V2, and the via wiring V6 corresponds to the via wiring V3.

Figure 6:
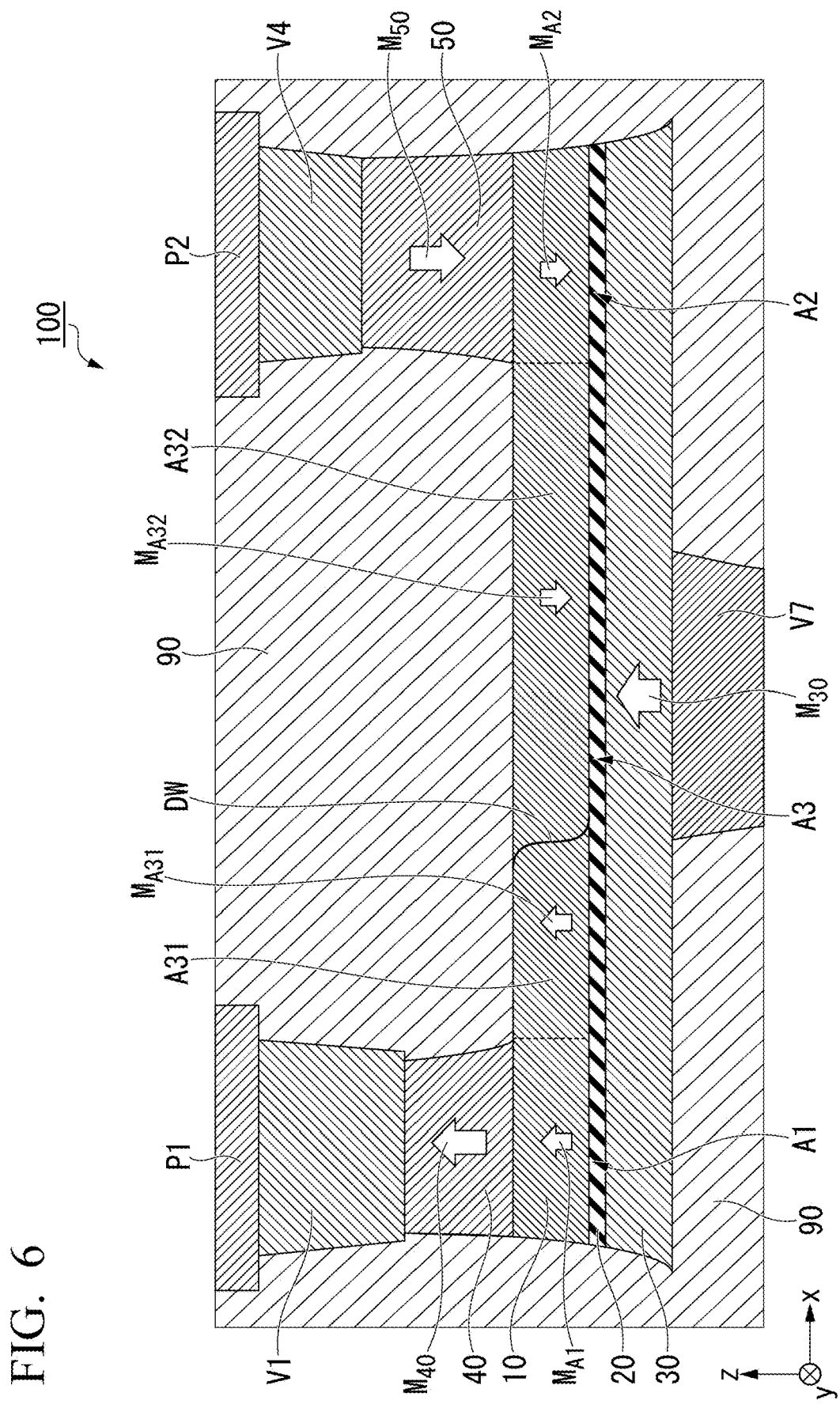
FIG. 6 is a cross-sectional view of a magnetoresistive element according to the first embodiment.

FIG. 6 is a cross-sectional view of the magnetoresistive element 100 along an xz plane passing through the center of the first ferromagnetic layer 10 in the y direction. An arrow shown in the drawing is an example of a magnetization orientation direction of a ferromagnetic material.

The magnetoresistive element 100 includes, for example, the first ferromagnetic layer 10, a nonmagnetic layer 20, the second ferromagnetic layer 30, the first magnetization fixed layer 40, and the second magnetization fixed layer 50. The magnetoresistive element 100 may also be referred to as a magnetic domain wall motion type magnetoresistive element, or may also be referred to as a magnetic domain wall motion element alone. A periphery of the magnetoresistive element 100 is covered with an insulator 90.

The first ferromagnetic layer 10 extends in the x direction. When viewed in the z direction, the length of the first ferromagnetic layer 10 in the x direction is longer than that in the y direction, for example. The first ferromagnetic layer 10 has two domains inside and has a magnetic domain wall DW at a boundary of the two domains. The first ferromagnetic layer 10 is, for example, a layer capable of magnetically recording information by changing a magnetic state. The first ferromagnetic layer 10 is also called an analog layer, a magnetic recording layer, or a magnetic domain wall motion layer.

The first ferromagnetic layer 10 has a first magnetization region A1, a second magnetization region A2, and a third magnetization region A3.

The first magnetization region A1 is a region in which the orientation direction of a magnetization $M_{A1}$ is fixed in one direction. In the state in which the magnetization is fixed, the magnetization is not reversed in a normal operation of the magnetic domain wall motion element 110 (an external force exceeding estimation is not applied). The first magnetization region A1 is, for example, a region of the first ferromagnetic layer 10 that overlaps the first magnetization fixed layer 40 when viewed in the z direction. The magnetization $M_{A1}$ of the first magnetization region A1 is fixed, for example, by a magnetization $M_{40}$ of the first magnetization fixed layer 40.

The second magnetization region A2 is a region in which the orientation direction of a magnetization $M_{A2}$ is fixed in one direction. The orientation direction of the magnetization $M_{A2}$ of the second magnetization region A2 is different from the orientation direction of the magnetization $M_{A1}$ of the first magnetization region A1. The orientation direction of the magnetization $M_{A2}$ of the second magnetization region A2 is, for example, opposite to the orientation direction of the magnetization $M_{A1}$ of the first magnetization region A1. The second magnetization region A2 is, for example, a region of the first ferromagnetic layer 10 that overlaps the second magnetization fixed layer 50 when viewed in the z direction. The magnetization $M_{A2}$ of the second magnetization region A2 is fixed, for example, by a magnetization $M_{50}$ of the second magnetization fixed layer 50.

The third magnetization region A3 is a region other than the first magnetization region A1 and the second magnetization region A2 of the first ferromagnetic layer 10. The third magnetization region A3 is, for example, a region interposed between the first magnetization region A1 and the second magnetization region A2 in the x direction.

The third magnetization region A3 is a region in which a magnetization direction can change and the magnetic domain wall DW can move. The third magnetization region A3 is called a magnetic domain wall movable region. The third magnetization region A3 has a first domain A31 and a second domain A32. The first domain A31 and the second domain A32 have opposite magnetization orientation directions. A boundary between the first domain A31 and the second domain A32 is the magnetic domain wall DW. A magnetization $M_{A31}$ of the first domain A31 is oriented in the same direction as the magnetization $M_{A1}$ of the first magnetization region A1, for example. A magnetization $M_{A32}$ of the second domain A32 is oriented in the same direction as the magnetization $M_{A2}$ of the adjacent second magnetization region A2, for example. In principle, the magnetic domain wall DW moves in the third magnetization region A3 and does not invade the first magnetization region A1 and the second magnetization region A2.

When a volume ratio of the first domain A31 and the second domain A32 in the third magnetization region A3 changes, the magnetic domain wall DW moves. The magnetic domain wall DW moves by a write current being allowed to flow in the x direction of the third magnetization region A3. For example, when a write current (for example, a current pulse) is applied in a +x direction of the third magnetization region A3, electrons flow in a –x direction opposite to the current, and thus the magnetic domain wall DW moves in the –x direction. In a case in which a current flows from the first domain A31 to the second domain A32, the electrons spin-polarized in the second domain A32 reverse the magnetization $M_{A31}$ of the first domain A31. By reversing the magnetization $M_{A31}$ of the first domain A31, the magnetic domain wall DW moves in the –x direction.

The first ferromagnetic layer 10 is made of a magnetic material. The first ferromagnetic layer 10 may be a ferromagnetic material, a ferrimagnetic material, or a combination of these materials and an antiferromagnetic material whose magnetic state can be changed by a current. The first ferromagnetic layer 10 preferably has at least one element selected from the group consisting of Co, Ni, Fe, Pt, Pd, Gd, Tb, Mn, Ge, and Ga.

Examples of the material used for the first ferromagnetic layer 10 include a stacked film of Co and Ni, a stacked film of Co and Pt, a stacked film of Co and Pd, a stacked film of $Co_xFe_{1-x}B$ ($0 \leq x \leq 1$) and the same material as the nonmagnetic layer 20 which will be described below, MnGa-based materials, GdCo-based materials, and TbCo-based materials. In the ferrimagnetic materials such as the MnGa-based materials, the GdCo-based materials, and the TbCo-based materials, the saturation magnetization is small, and the threshold current required to move the magnetic domain wall DW is small. Further, in the stacked film of Co and Ni, the stacked film of Co and Pt, and the stacked film of Co and Pd, coercivity is large, and the movement speed of the magnetic domain wall DW is slow. The antiferromagnetic material is, for example, $Mn_3X$ (X is Sn, Ge, Ga, Pt, Ir, or the like), CuMnAs, $Mn_2Au$, or the like. The same material as the second ferromagnetic layer 30 which will be described below can also be applied as the first ferromagnetic layer 10. It is also possible to apply two or more types of stacked films and materials as the first ferromagnetic layer 10.

The nonmagnetic layer 20 is interposed between the first ferromagnetic layer 10 and the second ferromagnetic layer 30. The nonmagnetic layer 20 inhibits magnetic coupling between the first ferromagnetic layer 10 and the second ferromagnetic layer 30. The nonmagnetic layer 20 is stacked on one surface of the second ferromagnetic layer 30.

The nonmagnetic layer 20 is made of, for example, a nonmagnetic insulator, semiconductor, or metal. The nonmagnetic layer 20 is preferably made of, for example, a nonmagnetic insulator. The nonmagnetic insulator is, for example, $Al_2O_3$, $SiO_2$, MgO, $MgAl_2O_4$, or a material in which some Al, Si, or Mg in $Al_2O_3$, $SiO_2$, MgO, or $MgAl_2O_4$ is replaced with Zn, Be, Ga, Ti, or the like. These materials have large bandgaps and excellent insulating properties. The nonmagnetic insulator is, for example, an oxide containing Mg or Al. In a case in which the nonmagnetic layer 20 is made of the nonmagnetic insulator, the nonmagnetic layer 20 is a tunnel barrier layer. The nonmagnetic metal is, for example, Cu, Au, Ag, or the like. The nonmagnetic semiconductor is, for example, Si, Ge, $CuInSe_2$, $CuGaSe_2$, Cu (In, Ga) $Se_2$, or the like.

A thickness of the nonmagnetic layer 20 is, for example, 20 Å or more and may be 25 Å or more.

The nonmagnetic layer 20 is interposed between the second ferromagnetic layer 30 and first ferromagnetic layer 10 in the z direction. The second ferromagnetic layer 30 is located at a position where at least a portion thereof overlaps the third magnetization region A3 in the z direction. For example, the second ferromagnetic layer 30 is closer to the semiconductor substrate than the first ferromagnetic layer 10. A magnetoresistive element in which the second ferromagnetic layer 30 is closer to the semiconductor substrate than the first ferromagnetic layer 10 is called a bottom pin structure.

A magnetization $M_{30}$ of the second ferromagnetic layer 30 is less likely to be reversed than a magnetization of the third magnetization region A3 of the first ferromagnetic layer 10. In the magnetization $M_{30}$ of the second ferromagnetic layer 30, a direction does not change when an external force is applied to the extent that the magnetization of the third magnetization region A3 is reversed, and the magnetization $M_{30}$ is fixed. The second ferromagnetic layer 30 may be referred to as a fixed layer or a reference layer.

The second ferromagnetic layer 30 contains a ferromagnetic material. The second ferromagnetic layer 30 contains, for example, a material that easily obtains a coherent tunneling effect with the first ferromagnetic layer 10. The second ferromagnetic layer 30 contains, for example, a metal selected from the group consisting of Cr, Mn, Co, Fe, and Ni, an alloy containing one or more of these metals, an alloy containing these metals and at least one or more elements of B, C, and N, or the like. The second ferromagnetic layer 30 is made of, for example, Co—Fe, Co—Fe—B, or Ni—Fe. Further, a stacked film of Co and Ni, a stacked film of Co and Pt, or a stacked film of Co and Pd may be used for a part of the second ferromagnetic layer 30.

The second ferromagnetic layer 30 may be, for example, a Heusler alloy. The Heusler alloy is a half metal and has a high spin polarization. The Heusler alloy is an intermetallic compound having a chemical composition of XYZ or $X_2YZ$, where X is a transition metal element or noble metal element from the Co, Fe, Ni, or Cu group in the periodic table, Y is a transition metal element from the Mn, V, Cr, or Ti group in the periodic table or the same type of element as for X, and Z is a typical element from Groups III to V in the periodic table. The Heusler alloy is, for example, $Co_2FeSi$, $Co_2FeGe$, $Co_2FeGa$, $Co_2MnSi$, $Co_2Mn_{1-a}Fe_aAl_bSi_{1-b}$, $Co_2FeGe_{1-c}Ga_c$, or the like.

The second ferromagnetic layer 30 may have a plurality of layers and may have a synthetic antiferromagnetic structure (an SAF structure). The synthetic antiferromagnetic structure is constituted by two magnetic layers with a nonmagnetic spacer layer interposed therebetween. The magnetic layer contains, for example, a ferromagnetic material, and may contain an antiferromagnetic material such as IrMn or PtMn. The spacer layer contains, for example, at least one selected from the group consisting of Ru, Ir, and Rh.

Each of the second ferromagnetic layer 30 and the nonmagnetic layer 20 is longer than the third magnetization region A3 in the x direction, for example. A portion where the second ferromagnetic layer 30 and the third magnetization region A3 face each other with the nonmagnetic layer 20 interposed therebetween is responsible for a resistance change of the magnetoresistive element 100. When the length of each of the second ferromagnetic layer 30 and the nonmagnetic layer 20 in the x direction is longer than the length of the third magnetization region A3 in the x direction, the width of the resistance change of the magnetoresistive element 100 can be more easily divided into multiple values.

The second ferromagnetic layer 30 is longer than the first ferromagnetic layer 10 in the x direction, for example. When the second ferromagnetic layer 30 overlaps the entire first ferromagnetic layer 10 when viewed in the z direction, the heat radiation of the first ferromagnetic layer 10 is improved. As a result, the stability of the magnetization of the first magnetization region A1 and the magnetization of the second magnetization region A2 increases, and the reliability of the data of the magnetoresistive element 100 increases.

The first magnetization fixed layer 40 is connected to the first ferromagnetic layer 10 and the via wiring V1. The first magnetization fixed layer 40 is connected to the first magnetization region A1 of the first ferromagnetic layer 10. The magnetization $M_{40}$ of the first magnetization fixed layer 40 fixes the magnetization of the first magnetization region A1.

The first magnetization fixed layer 40 is made of a ferromagnetic material, for example. For example, the same material as the first ferromagnetic layer 10 or the second ferromagnetic layer 30 can be applied as the first magnetization fixed layer 40. The first magnetization fixed layer 40 may have a plurality of layers. For example, the first magnetization fixed layer 40 may have a stacked structure of a plurality of layers and may include a mask layer, a cap layer, or the like during manufacturing.

The first magnetization fixed layer 40 may have a plurality of layers and may have a synthetic antiferromagnetic structure (an SAF structure). The synthetic antiferromagnetic structure is constituted by two magnetic layers with a nonmagnetic spacer layer interposed therebetween. The magnetic layer contains, for example, a ferromagnetic material, and may contain an antiferromagnetic material such as IrMn and PtMn. The spacer layer contains, for example, at least one selected from the group consisting of Ru, Ir, and Rh.

Further, the first magnetization fixed layer 40 is not limited to the ferromagnetic material. In a case in which the first magnetization fixed layer 40 is not made of the ferromagnetic material, a current density of the current flowing through the first ferromagnetic layer 10 in the region overlapping the first magnetization fixed layer 40 is sharply changed, and thus the movement of the magnetic domain wall DW is limited and the magnetization of the first magnetization region A1 is fixed.

The second magnetization fixed layer 50 is connected to the first ferromagnetic layer 10 at a position separated from the first magnetization fixed layer 40 in the x direction. The second magnetization fixed layer 50 is connected to the via wiring V4 and the first ferromagnetic layer 10. The second magnetization fixed layer 50 is connected to the second magnetization region A2 of the first ferromagnetic layer 10. The magnetization $M_{50}$ of the second magnetization fixed layer 50 fixes the magnetization of the second magnetization region A2.

The second magnetization fixed layer 50 can be made of the same material as the first magnetization fixed layer 40. The second magnetization fixed layer 50 does not need to be made of a ferromagnetic material. The second magnetization fixed layer 50 may have a synthetic antiferromagnetic structure (an SAF structure). The second magnetization fixed layer 50 may have a plurality of layers. For example, the second magnetization fixed layer 50 may have a stacked structure of a plurality of layers and may include a mask layer, a cap layer, or the like during manufacturing.

The film thickness of the first magnetization fixed layer 40 and the film thickness of the second magnetization fixed layer 50 may be the same or different. For example, the film thickness of the first magnetization fixed layer 40 is smaller than the film thickness of the second magnetization fixed layer 50. If the film thickness of the first magnetization fixed layer 40 and the film thickness of the second magnetization fixed layer 50 are different, a difference in coercivity between the first magnetization fixed layer 40 and the second magnetization fixed layer 50 is likely to be generated. If there is a coercivity difference between the first magnetization fixed layer 40 and the second magnetization fixed layer 50, the orientation direction of the magnetization $M_{40}$ of the first magnetization fixed layer 40 and the orientation direction of the magnetization $M_{50}$ of the second magnetization fixed layer 50 are likely to be set different at the time of manufacture.

It is possible to check a magnetization direction of each layer of the magnetoresistive element 100 by measuring a magnetization curve, for example. The magnetization curve can be measured using, for example, a magneto optical Kerr effect (MOKE). The measurement using MOKE is a measurement method performed by making linearly polarized light incident on an object to be measured and using a magneto optical effect (a magnetic Kerr effect) in which rotation in a polarization direction thereof or the like occurs.

The magnetic domain wall motion element 110 can be manufactured by repeating a stacking step of stacking each layer and a processing step of processing a part of each layer into a predetermined shape or forming a via between the layers. A general semiconductor process can be applied to manufacture the magnetic domain wall motion element 110.

Next, a write operation of a signal to the magnetic array MA and a read operation of a signal from the magnetic array MA will be described.

First, the write operation of a signal to the magnetic array MA will be explained. The write operation is performed, for example, by a processor executing an operation program stored in the control part 6.

First, the control device 3 selects the magnetic domain wall motion element 110 to which a pulse is applied according to the operation program. In a case where the magnetic array MA is used as a magnetic memory, the magnetic domain wall motion element 110 to which a pulse is applied is an element that stores data. In a case where the magnetic array MA is used as a neural network, the magnetic domain wall motion element 110 to which a pulse is applied is an element that changes weight according to learning.

The control part 6 controls which magnetic domain wall motion element 110 of the plurality of magnetic domain wall motion elements 110 a pulse is applied to. The control part 6 turns on the switch element SW1 and the switch element SW2 of the magnetic domain wall motion element 110 to which a pulse is applied, and turns off the switch element SW3. Further, at least one of the switch element SW1 and the switch element SW2 of the magnetic domain wall motion element 110 to which no pulse is applied is turned off.

Then, the control device 3 outputs a write pulse toward the magnetic domain wall motion element 110 according to the operation program. The write pulse flows, for example, from the switch element SW1 to the via wiring V2, the via wiring V3, the in-plane wiring P1, and the via wiring V1 in that order, and reaches the magnetoresistive element 100. The write pulse is applied between the first magnetization fixed layer 40 and the second magnetization fixed layer 50 along the first ferromagnetic layer 10 of the magnetoresistive element 100. The write pulse may be a rectangular wave, a spike wave, or a wave having any other waveform. By changing the number of write pulses, the magnitude, or the like, the position of the magnetic domain wall DW changes, and a signal is written to a specific magnetic domain wall motion element 110.

Next, the read operation of a signal from the magnetic array MA will be explained. The read operation is performed, for example, by a processor executing an operation program stored in the control part 6.

First, the control device 3 selects the magnetic domain wall motion element 110 to which a read pulse is applied according to the operation program. In a case where the magnetic array MA is used as a magnetic memory, the magnetic domain wall motion element 110 to which a read pulse is applied is an element that reads data. In a case where the magnetic array MA is used as a neural network, application of a read pulse to a predetermined magnetic domain wall motion element 110 corresponds to a product calculation of the input and the weight. That is, in a case where the magnetic array MA is used as a neural network, the read operation is an identification calculation of the neural network.

The control part 6 controls which magnetic domain wall motion element 110 of the plurality of magnetic domain wall motion elements 110 a pulse is applied to. The control part 6 turns on the switch element SW3 and the switch element SW2 of the magnetic domain wall motion element 110 to which a pulse is applied, and turns off the switch element SW1. Further, at least one of the switch element SW3 and the switch element SW2 of the magnetic domain wall motion element 110 to which no pulse is applied is turned off.

Next, the control device 3 applies a read pulse to a predetermined magnetic domain wall motion element 110 according to the operation program. The read pulse is applied between the read wiring WL and the second magnetization fixed layer 50, for example. The voltage of the read pulse is a voltage at which a current density lower than a critical current density required to move the magnetic domain wall DW of the first ferromagnetic layer 10 is obtained. That is, the read pulse does not move the magnetic domain wall DW.

The resistance detection device 4 detects the resistance value of the magnetoresistive element 100 to which a read pulse is applied. The output part 5 outputs the calculation results to the outside, for example. With such a procedure, a signal can be read from a specific magnetic domain wall motion element 110.

In the magnetic domain wall motion element 110 according to the present embodiment, the magnetic field generated by a write current flowing through the via wiring has little influence on the magnetization of the first ferromagnetic layer 10.

Figure 7:
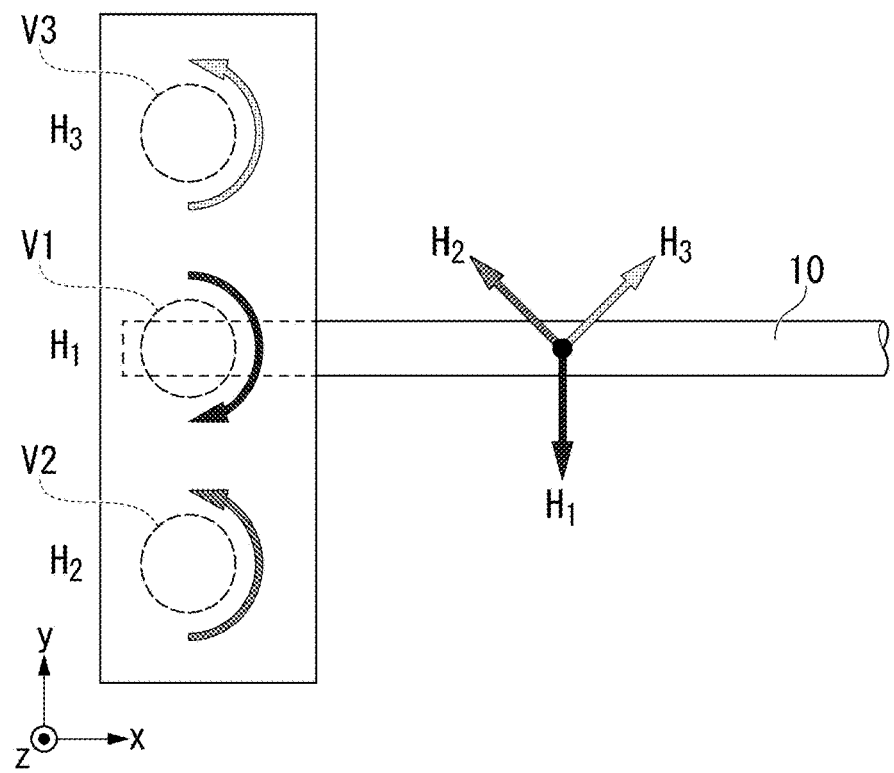
FIG. 7 is a schematic diagram for explaining the effect of the magnetic domain wall motion element according to the first embodiment.

FIG. 7 is a schematic diagram for explaining the effect of the magnetic domain wall motion element 110 according to the first embodiment.

When data is written to the magnetic domain wall motion element 110, a write current flows between the switch element SW1 and the switch element SW2. A write current flows from the switch element SW1 to each of the via wiring V2 and the via wiring V3, for example. A write current flowing through the via wiring V2 and a write current flowing through the via wiring V3 join at the in-plane wiring P1 and flow to the via wiring V1.

A flow direction of a write current in the via wiring V2 and the via wiring V3 is opposite to a flow direction of a write current in the via wiring V1. For example, in a case where a write current flows in the +z direction in the via wiring V2 and the via wiring V3, a write current flows in the −z direction in the via wiring V1. Further, for example, in a case where a write current flows in the −z direction in the via wiring V2 and the via wiring V3, a write current flows in the +z direction in the via wiring V1.

A write current flowing through the via wiring V1 generates a magnetic field $H_1$. A write current flowing through the via wiring V2 generates a magnetic field $H_2$. A write current flowing through the via wiring V3 generates a magnetic field $H_3$. A direction in which the magnetic field $H_1$ is generated is opposite to a direction in which the magnetic fields $H_2$ and $H_3$ are generated.

For example, at a specific position of the first ferromagnetic layer 10, the magnetic field $H_1$ is applied in the −y direction. On the other hand, at a specific position of the first ferromagnetic layer 10, the magnetic field $H_2$ and the magnetic field $H_3$ are applied to have a component in the ty direction. For this reason, in the y direction, the magnetic field $H_1$, the magnetic field $H_2$, and the magnetic field $H_3$ are in a relationship in which they cancel each other out.

Further, for example, at a specific position of the first ferromagnetic layer 10, the magnetic field $H_2$ is applied to have a component in the −x direction. On the other hand, at a specific position of the first ferromagnetic layer 10, the magnetic field $H_3$ is applied to have a component in the +x direction. For this reason, in the x direction, the magnetic field $H_2$ and the magnetic field $H_3$ are in a relationship in which they cancel each other out.

As described above, in the magnetic domain wall motion element 110 according to the first embodiment, the magnetic fields $H_1$, $H_2$, and $H_3$ generated in the via wiring V1, the via wiring V2, and the via wiring V3 are in a relationship in which they cancel each other out. As a result, the magnetic field generated by a write current flowing through the via wiring has little influence on the magnetization of the first ferromagnetic layer 10.

The magnetic domain wall motion element 110 according to the first embodiment can be used in, for example, a magnetic memory or a neuromorphic device.

In the case of the magnetic memory, each of the magnetic domain wall motion elements 110 functions as an element that stores data. The resistance of the magnetic domain wall motion element 110 changes at the position of the magnetic domain wall DW of the magnetic domain wall motion element 110, and this resistance value is stored as data.

In the case of the neuromorphic device, each of the magnetic domain wall motion elements 110 functions as a product calculation element. The resistance of the magnetic domain wall motion element 110 changes at the position of the magnetic domain wall DW of the magnetic domain wall motion element, and this resistance value or the conductance which is a reciprocal of the resistance value represents the weight.

The neuromorphic device is a device that artificially imitates the relationship between neurons and synapses in the human brain. The neuromorphic device is capable of performing a calculation of the neural network.

Figure 8:
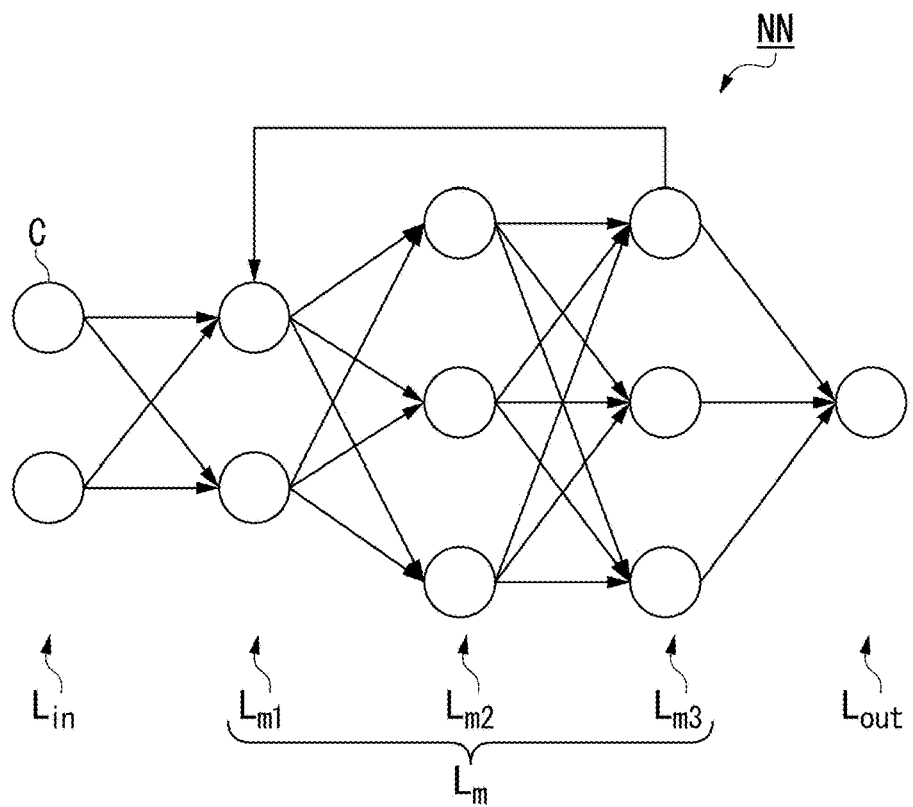
FIG. 8 is a conceptual diagram of a neural network.

FIG. 8 is a schematic diagram of a neural network NN. The neural network NN has an input layer $L_{in}$, an intermediate layer $L_m$, and an output layer $L_{out}$. FIG. 8 shows an example of three intermediate layers $L_m$, but the number of intermediate layers $L_m$ is not limited. Each of the input layer $L_{in}$, the intermediate layer $L_m$, and the output layer $L_{out}$ has a plurality of chips C, and each chip C corresponds to a neuron in the brain. The input layer $L_{in}$, the intermediate layer $L_m$, and the output layer $L_{out}$ are connected by a transmission means. The transmission means corresponds to synapses in the brain. The number of chips C and transmission means shown in FIG. 8 is an example.

The neural network NN increases the percentage of correct answers to questions by learning by means of the transmission means (synapses). Learning is to find knowledge that can be used in the future from information. The neural network NN learns by operating while changing the weight of the transmission means. The transmission means performs a product calculation to apply the weight to the input signal and a sum calculation to add the results of the product calculation. That is, the transmission means performs a product and sum calculation. The magnetic domain wall motion element 110 according to the present embodiment is responsible for this product calculation.

Figure 9:
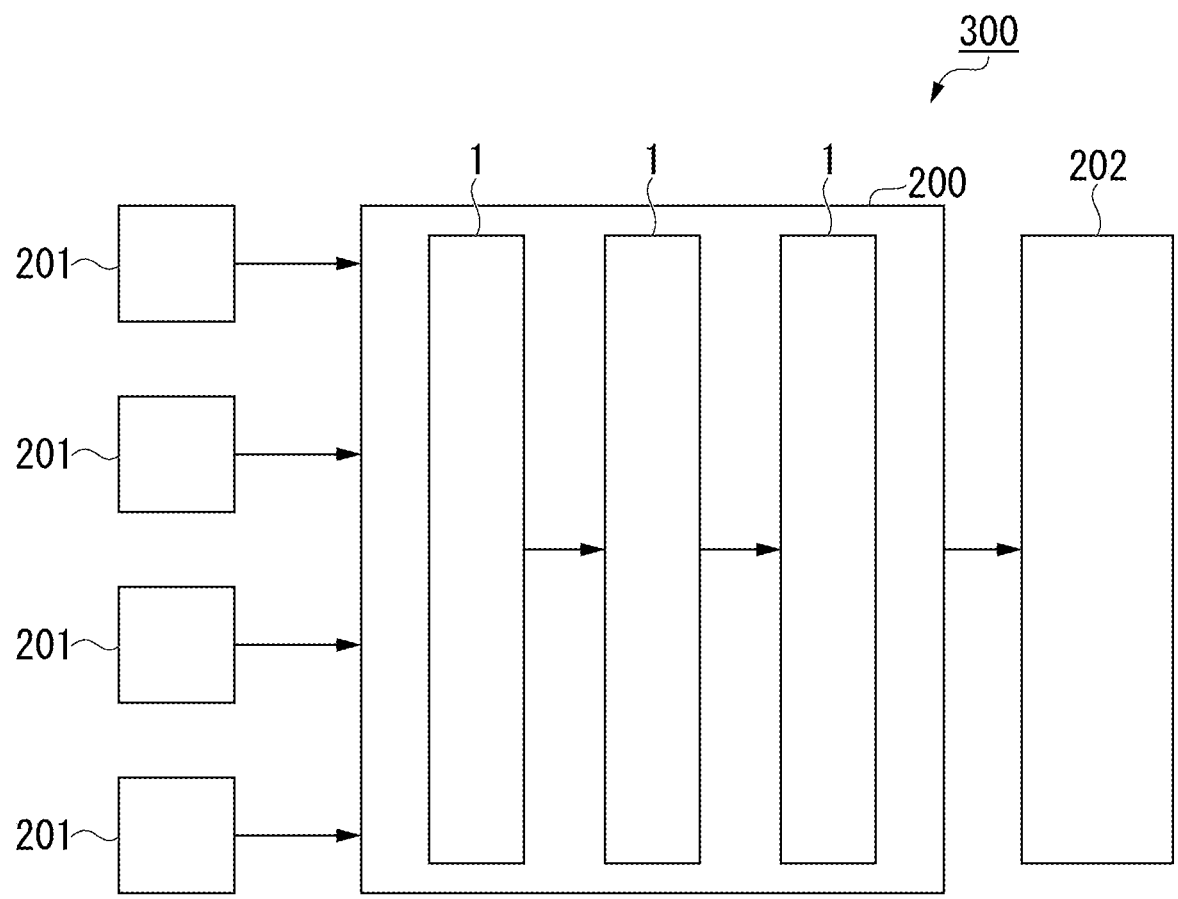
FIG. 9 is a block diagram showing a system including a neuromorphic device.

FIG. 9 is a block diagram showing a system 300 including a neuromorphic device 200 according to the first embodiment. The system 300 has a plurality of sensors 201, a neuromorphic device 200, and a communication part 202.

Each of the plurality of sensors 201 can be any sensor that is appropriate for the application. For example, a temperature sensor, a humidity sensor, a speed sensor, a pressure sensor, an acceleration sensor, and the like can be used as the plurality of sensors 201. The signals from these sensors correspond, for example, to the signals input to the input layer $L_{in}$ in the neural network NN.

The neuromorphic device 200 has a plurality of integrated regions 1, for example. In each of the integrated regions 1, a product and sum calculation is performed. Each of the integrated regions 1 performs a calculation from each layer of the neural network NN to the next layer thereof. The integrated regions 1 may each have a separate control device 3 or may share the control device 3.

The conductance (or the resistance) of the magnetoresistive element 100 changes depending on the position of the magnetic domain wall DW. The conductance (or the resistance) of the magnetoresistive element 100 corresponds to the weight of the transmission means in the neural network NN. The conductance (or the resistance) of the magnetoresistive element 100 changes linearly with respect to the input. For example, in a case where the information (for example, the temperature) of a specific sensor 201 among the plurality of sensors 201 is important, when the neuromorphic device 200 learns, the conductance (the weight) of the magnetoresistive element 100 responsible for propagating a signal from that sensor 201 is increased.

The magnetoresistive element 100 outputs the product of the input voltage and the conductance (or the resistance) of the magnetoresistive element 100 as a signal, and thus functions as a product calculation element. The magnetic array MA combines the outputs from the plurality of magnetoresistive elements 100, and thus functions as a product and sum calculation device. The product and sum calculation by the plurality of magnetoresistive elements 100 is controlled by the control device 3.

The neuromorphic device 200 performs learning and inference. The conductance of the magnetoresistive element 100 (corresponding to the weight of the transmission means) is adjusted during learning. The inference is performed using the conductance of the magnetoresistive element 100 (corresponding to the weight of the transmission means) that is set.

The neuromorphic device 200 used in the system 300 may be capable of performing both learning and inference, or may preform only inference. In a case where only inference is performed, learning adapted to the task is performed in advance, and the weight adapted to the task is installed in the magnetoresistive element 100 of the neuromorphic device 200. For example, the conductance of each magnetoresistive element 100 is adjusted to correspond to the weight of the transmission means determined in advance learning. If the neuromorphic device 200 performs only inference, the calculation load on an edge device can be reduced.

The communication part 202 outputs the calculation results of the neuromorphic device 200 to the outside. For example, the inference results for a predetermined task which are obtained by the neuromorphic device 200 are input to the communication part 202, and the communication part 202 outputs this information to the outside. The communication part 202 may be wired or wireless.

The magnetic domain wall motion element 110 according to the present embodiment is little affected by the leakage magnetic field from the write wiring and has excellent operational stability, and thus the system 300 has high reliability.

Second Embodiment

Figure 10:
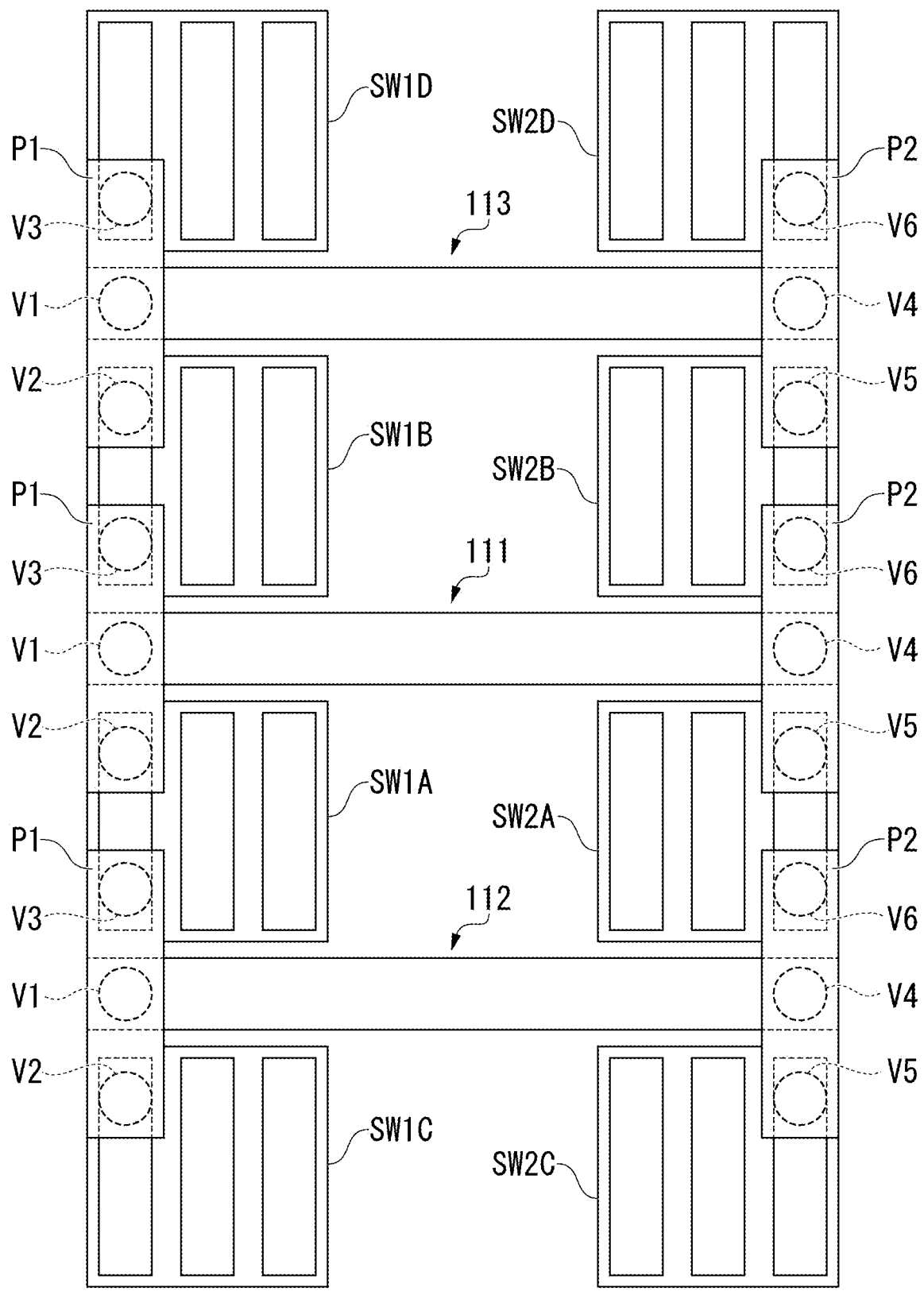
FIG. 10 is a plan view of a part of an integrated region according to a second embodiment.

FIG. 10 is a plan view of a part of an integrated region according to a second embodiment. The integrated region has a plurality of magnetic domain wall motion elements and a plurality of switch elements. In the second embodiment, the same constituent elements as those in the first embodiment are designated by the same reference signs, and the description thereof will be omitted.

The plurality of magnetic domain wall motion elements have, for example, a first magnetic domain wall motion element 111, a second magnetic domain wall motion element 112, and a third magnetic domain wall motion element 113. The first magnetic domain wall motion element 111 is located between the second magnetic domain wall motion element 112 and the third magnetic domain wall motion element 113 in the y direction. The first magnetic domain wall motion element 111 is adjacent to each of the second magnetic domain wall motion element 112 and the third magnetic domain wall motion element 113.

The plurality of switch elements have, for example, a switch element SW1A, a switch element SW1B, a switch element SW1C, a switch element SW1D, a switch element SW2A, a switch element SW2B, a switch element SW2C, and a switch element SW2D. The switch element SW1A is an example of a first switch element, and the switch element SW1B is an example of a second switch element.

Figure 11:
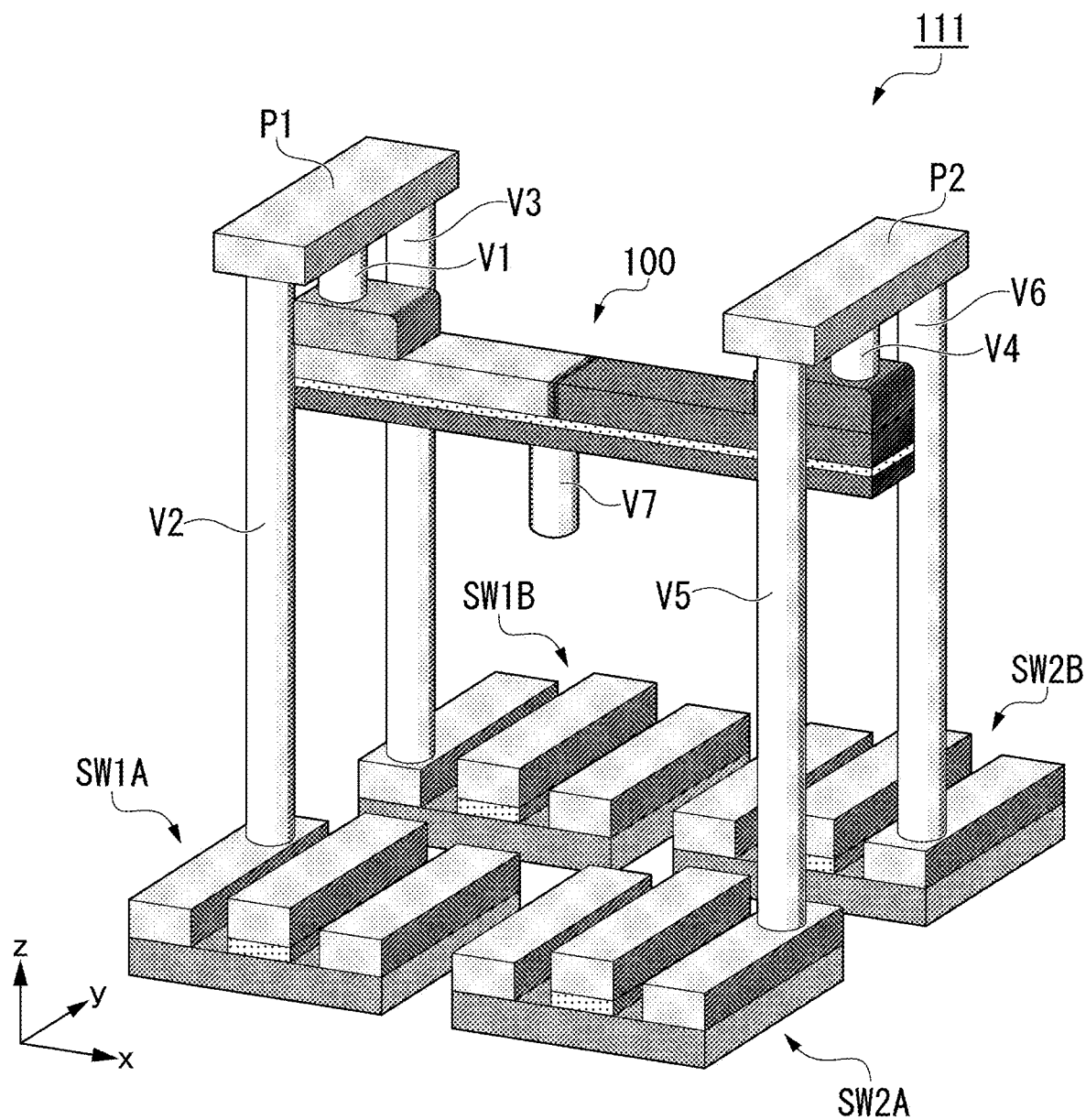
FIG. 11 is a perspective view of a magnetic domain wall motion element according to the second embodiment.

FIG. 11 is a perspective view of the first magnetic domain wall motion element 111 according to the second embodiment.

A via wiring V2 of the first magnetic domain wall motion element 111 is connected to the switch element SW1A. A via wiring V3 of the first magnetic domain wall motion element 111 is connected to the switch element SW1B. That is, the via wiring V2 and the via wiring V3 of the first magnetic domain wall motion element 111 are connected to different switch elements.

A via wiring V5 of the first magnetic domain wall motion element 111 is connected to the switch element SW2A. A via wiring V6 of the first magnetic domain wall motion element 111 is connected to the switch element SW2B. That is, the via wiring V5 and the via wiring V6 of the first magnetic domain wall motion element 111 are connected to different switch elements.

When data is written to the first magnetic domain wall motion element 111, the switch element SW1A, the switch element SW1B, the switch element SW2A, and the switch element SW2B are turned on. On a first end side of the magnetoresistive element 100, a write current is controlled by two switch elements SW1A and SW1B. In contrast, the switch element SW1 according to the first embodiment controls a write current to the magnetoresistive element 100 with one element. The voltage applied to each of the switch element SW1A and the switch element SW1B is half the voltage applied to the switch element SW1 according to the first embodiment. For this reason, the element size of each of the switch element SW1A and the switch element SW1B can be made smaller than the element size of the switch element SW1.

Further, a via wiring V2 of the second magnetic domain wall motion element 112 is connected to the switch element SW1C. A via wiring V3 of the second magnetic domain wall motion element 112 is connected to the switch element SW1A. The switch element SW1A is shared by the first magnetic domain wall motion element 111 and the second magnetic domain wall motion element 112.

Further, a via wiring V2 of the third magnetic domain wall motion element 113 is connected to the switch element SW1B. A via wiring V3 of the third magnetic domain wall motion element 113 is connected to the switch element SW1D. The switch element SW1B is shared by the first magnetic domain wall motion element 111 and the third magnetic domain wall motion element 113.

In each of the magnetic domain wall motion elements according to the second embodiment, the magnetic fields $H_1$, $H_2$, and $H_3$ generated in the via wiring V1, the via wiring V2, and the via wiring V3 are in a relationship in which they cancel each other out. As a result, the magnetic field generated by a write current flowing through the via wiring has little influence on the magnetization of the first ferromagnetic layer 10.

In each of the magnetic domain wall motion elements according to the second embodiment, a write current is controlled by two switch elements, and thus the size of the write switch element can be reduced. Furthermore, in the integrated region according to the second embodiment, adjacent magnetic domain wall motion elements share the write switch element. For this reason, the integrated region according to the second embodiment can increase the degree of integration of the magnetic domain wall motion elements.

Third Embodiment

Figure 12:
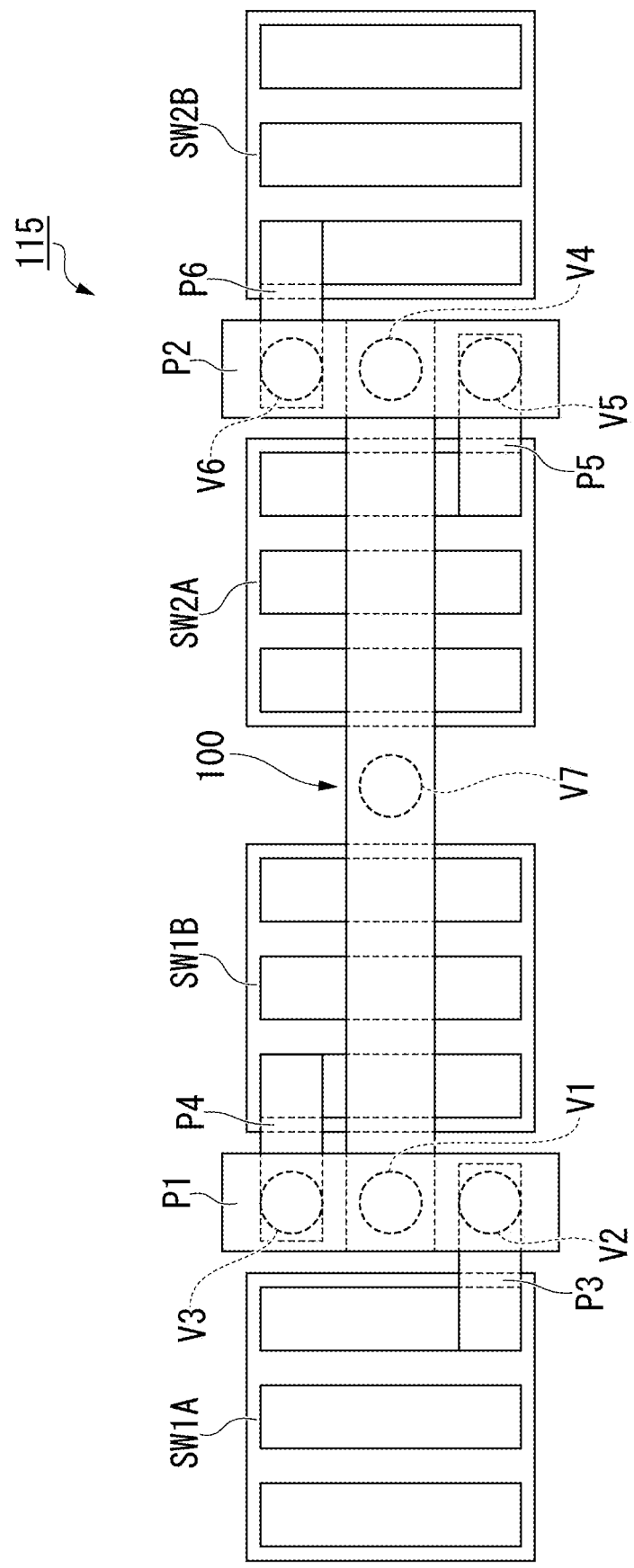
FIG. 12 is a plan view of a part of an integrated region according to a third embodiment.

FIG. 12 is a plan view of a magnetic domain wall motion element according to a third embodiment. A magnetic domain wall motion element 115 includes a magnetoresistive element 100, an in-plane wiring P1, an in-plane wiring P2, a via wiring V1, a via wiring V2, a via wiring V3, a via wiring V4, a via wiring V5, a via wiring V6, a via wiring V7, a switch element SW1A, a switch element SW1B, a switch element SW2A, a switch element SW2B, a connection wiring P3, a connection wiring P4, a connection wiring P5, and a connection wiring P6. In the third embodiment, the same constituent elements as those in the first embodiment and the second embodiment are designated by the same reference signs, and the description thereof will be omitted.

The switch element SW1A is connected to the via wiring V2 through the connection wiring P3. The switch element SW1B is connected to the via wiring V3 through the connection wiring P4. The switch element SW1A is an example of a first switch element, and the switch element SW1B is an example of a second switch element. The switch element SW1A and the switch element SW1B are arranged in the x direction. The switch element SW1B is located at a position overlapping the magnetoresistive element 100 in the z direction.

The switch element SW2A is connected to the via wiring V5 through the connection wiring P5. The switch element SW2B is connected to the via wiring V6 through the connection wiring P6. The switch element SW2A is an example of a first switch element, and the switch element SW2B is an example of a second switch element. The switch element SW2A and the switch element SW2B are arranged in the x direction. The switch element SW2A is located at a position overlapping the magnetoresistive element 100 in the z direction.

In the magnetic domain wall motion element 115 according to the third embodiment, the magnetic fields $H_1$, $H_2$, and $H_3$ generated in the via wiring V1, the via wiring V2, and the via wiring V3 are in a relationship in which they cancel each other out. As a result, the magnetic field generated by a write current flowing through the via wiring has little influence on the magnetization of the first ferromagnetic layer 10.

In the magnetic domain wall motion element 115 according to the third embodiment, a write current is controlled by two switch elements, and thus the size of the write switch element can be reduced. Further, in the magnetic domain wall motion element 115 according to the third embodiment, the switch element SW1B and the switch element SW2A are disposed at positions overlapping the magnetoresistive element 100 in the z direction. In the magnetic domain wall motion element 115 according to the third embodiment, the switch elements are efficiently disposed with respect to the magnetic domain wall motion element 115 that is long in the x direction. Therefore, the magnetic domain wall motion element 115 according to the third embodiment can be highly integrated.

Fourth Embodiment

Figure 13:
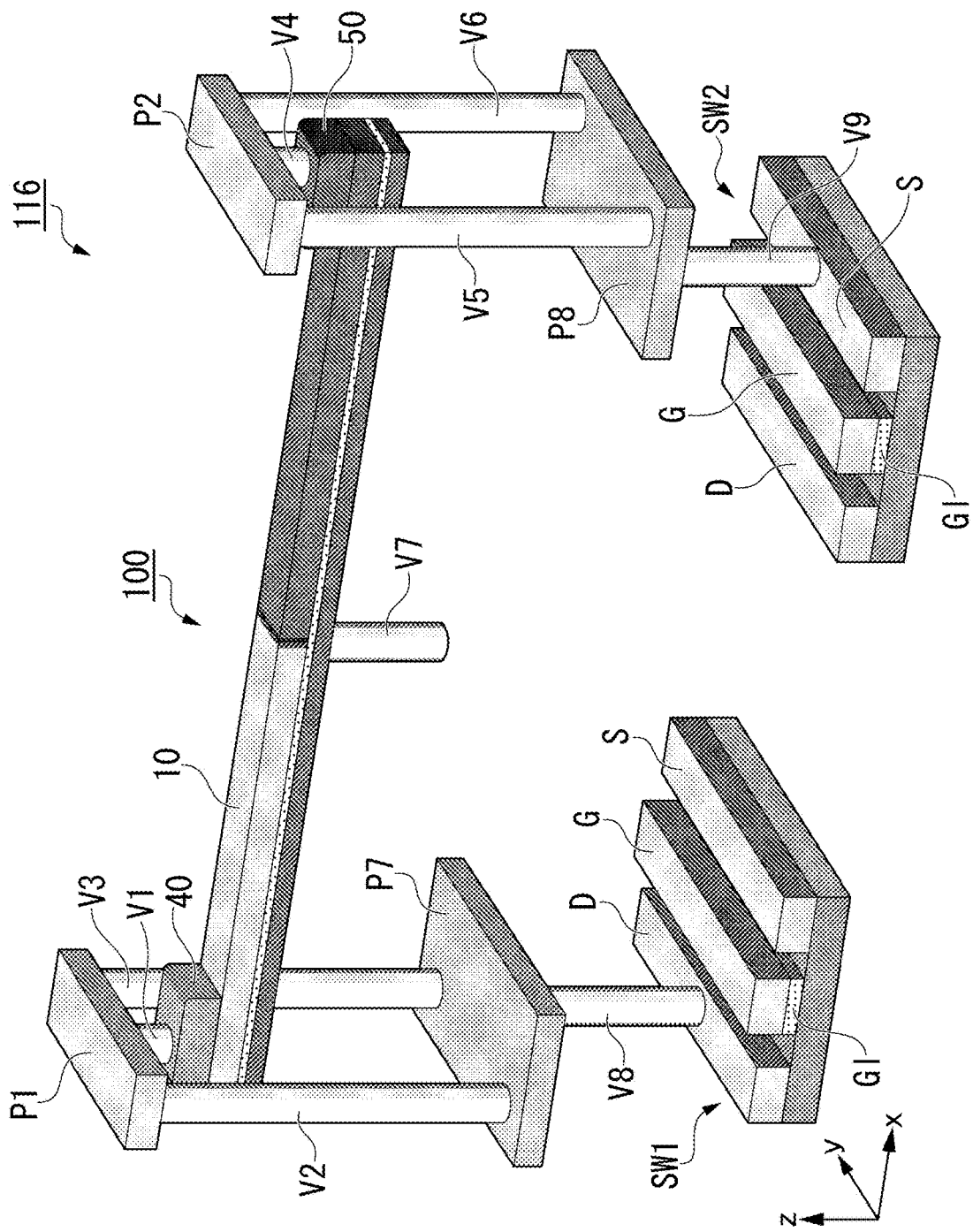
FIG. 13 is a perspective view of a magnetic domain wall motion element according to a fourth embodiment.

FIG. 13 is a perspective view of a magnetic domain wall motion element 116 according to a fourth embodiment. The magnetic domain wall motion element 116 includes a magnetoresistive element 100, an in-plane wiring P1, an in-plane wiring P2, an in-plane wiring P7, an in-plane wiring P8, a via wiring V1, a via wiring V2, a via wiring V3, a via wiring V4, a via wiring V5, a via wiring V6, a via wiring V7, a via wiring V8, a via wiring V9, a switch element SW1, and a switch element SW2. In the fourth embodiment, the same constituent elements as those in the first embodiment are designated by the same reference signs, and the description thereof will be omitted.

The magnetic domain wall motion element 116 according to the fourth embodiment is different from the magnetic domain wall motion element 110 according to the first embodiment in that the magnetic domain wall motion element 116 according to the fourth embodiment further includes an in-plane wiring P7, an in-plane wiring P8, a via wiring V8, and a via wiring V9.

The in-plane wiring P7 is located at a layer between the switch element SW1 and the in-plane wiring P1 in the z direction. The in-plane wiring P7 is connected to the via wiring V2 and the via wiring V3. Further, the in-plane wiring P7 is also connected to the via wiring V8. The via wiring V2 and the via wiring V3 merge at the in-plane wiring P7 and are unified into the via wiring V8. The via wiring V8 is connected, for example, to a drain D of the first switch element SW1.

The in-plane wiring P8 is located at a layer between the switch element SW2 and the in-plane wiring P2 in the z direction. The in-plane wiring P8 is connected to the via wiring V5 and the via wiring V6. Further, the in-plane wiring P8 is also connected to the via wiring V9. The via wiring V5 and the via wiring V6 merge at the in-plane wiring P8 and are unified into the via wiring V9. The via wiring V9 is connected, for example, to the source S of the second switch element SW2.

In the magnetic domain wall motion element 116 according to the fourth embodiment, the magnetic fields $H_1$, $H_2$, and $H_3$ generated in the via wiring V1, the via wiring V2, and the via wiring V3 are in a relationship in which they cancel each other out. As a result, the magnetic field generated by a write current flowing through the via wiring has little influence on the magnetization of the first ferromagnetic layer 10.

The magnetic domain wall motion element 116 according to the fourth embodiment has the in-plane wiring P7 and the in-plane wiring P8, and thus the number of via wirings connected to the first switch element SW1 and the second switch element SW2 can be reduced. Various wirings are often disposed in each layer between the magnetoresistive element 100 and the first switch element SW1 and the second switch element SW2. In a case where the in-plane wiring P1 and the first switch element SW1 are connected to each other with two via wirings V2 and V3 over the entire region in the z direction, it is necessary to arrange the wirings while avoiding these via wirings V2 and V3. By configuring the via wiring extending in the z direction to be branched at the in-plane wiring P7, the number of via wirings that pass through a certain layer can be reduced, and the degree of freedom in wiring arrangement is increased.

Although the preferred embodiment of the present disclosure has been described in detail above, the present disclosure is not limited to this embodiment. For example, the characteristic configurations of the embodiments may be combined, or a part thereof may be changed without changing the gist of the disclosure.

EXPLANATION OF REFERENCES

1 Integrated region
2 Peripheral region
3 Control device
4 Resistance detection device
5 Output part
6 Control part
7 Power supply
10 First ferromagnetic layer
20 Nonmagnetic layer
30 Second ferromagnetic layer
40 First magnetization fixed layer 50 Second magnetization fixed layer
90 Insulator
100 Magnetoresistive element
110, 115 Magnetic domain wall motion element
111 First magnetic domain wall motion element
112 Second magnetic domain wall motion element
113 Third magnetic domain wall motion element
200 Neuromorphic device
201 Sensor
202 Communication part
300 System
MA Magnetic array
P1, P2 In-plane wiring
P3, P4, P5, P6 Connection wiring
SW1, SW1A, SW1B, SW1C, SW1D, SW2, SW2A, SW2B, SW2C, SW2D, SW3 Switch element
V1, V2, V3, V4, V5, V6, V7 Via wiring

What is claimed is:

1. A magnetic domain wall motion element comprising a first ferromagnetic layer, an in-plane wiring, a first via wiring, a second via wiring, and a third via wiring,
wherein a position of the in-plane wiring in a stacking direction is different from that of the first ferromagnetic layer,
wherein the first via wiring connects the first ferromagnetic layer and the in-plane wiring to each other,
wherein the second via wiring is connected to the in-plane wiring at a different position from the first via wiring,
wherein the third via wiring is connected to the in-plane wiring at a different position from the first via wiring and the second via wiring, and
wherein, when centers of the second via wiring and the third via wiring are projected on an axis passing through a center of the first via wiring when viewed in the stacking direction and extending in a second direction orthogonal to a first direction that is a longitudinal direction of the first ferromagnetic layer and the stacking direction, the first via wiring is interposed between projection points of the second via wiring and the third via wiring to the axis in the second direction.

2. The magnetic domain wall motion element according to claim 1, further comprising a first magnetization fixed layer,
wherein the first magnetization fixed layer is located between the first ferromagnetic layer and the first via wiring, and
wherein the first via wiring connects the first ferromagnetic layer and the in-plane wiring to each other via the first magnetization fixed layer.

3. The magnetic domain wall motion element according to claim 1, wherein a direction in which a write current flows through the first via wiring and a direction in which a write current flows through the second via wiring and the third via wiring are opposite directions.

4. The magnetic domain wall motion element according to claim 1, wherein the first via wiring, the second via wiring, and the third via wiring are located at positions at least partially overlapping each other when viewed in the second direction.

5. The magnetic domain wall motion element according to claim 1, wherein at least a part of the second via wiring and the third via wiring are equidistant from the center of the first via wiring when viewed in the stacking direction.

6. The magnetic domain wall motion element according to claim 1, further comprising a first switch element,
wherein both the second via wiring and the third via wiring are connected to the first switch element.

7. The magnetic domain wall motion element according to claim 1, further comprising a first switch element and a second switch element,
wherein the second via wiring is connected to the first switch element, and
wherein the third via wiring is connected to the second switch element.

8. The magnetic domain wall motion element according to claim 7, wherein the first switch element and the second switch element are arranged in the first direction.

9. The magnetic domain wall motion element according to claim 1, further comprising a second ferromagnetic layer and a nonmagnetic layer,
wherein the nonmagnetic layer is interposed between the first ferromagnetic layer and the second ferromagnetic layer in the stacking direction.

10. A magnetic array comprising a plurality of magnetic domain wall motion elements,
wherein each of the plurality of magnetic domain wall motion elements is the magnetic domain wall motion element according to claim 1.

11. The magnetic array according to claim 10, further comprising a first switch element and a second switch element,
wherein the plurality of magnetic domain wall motion elements has a first magnetic domain wall motion element, a second magnetic domain wall motion element, and a third magnetic domain wall motion element,
wherein the first magnetic domain wall motion element is located between the second magnetic domain wall motion element and the third magnetic domain wall motion element in the second direction and is adjacent to each of the second magnetic domain wall motion element and the third magnetic domain wall motion element,
wherein the second via wiring of the first magnetic domain wall motion element and the third via wiring of the second magnetic domain wall motion element are connected to the first switch element, and
wherein the third via wiring of the first magnetic domain wall motion element and the second via wiring of the third magnetic domain wall motion element are connected to the second switch element.

* * * * *